Figure 1:
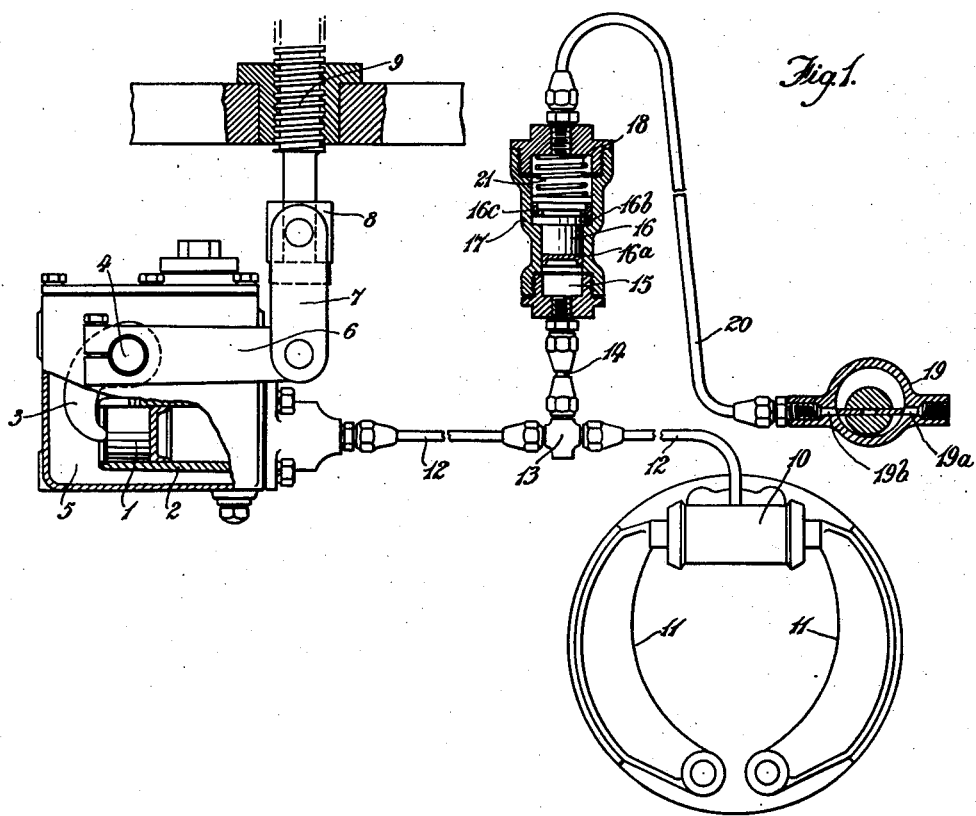

April 18, 1933.  E. B. BOUGHTON  1,903,973
BRAKE FOR USE ON VEHICLES
Filed May 4, 1931  2 Sheets-Sheet 1

INVENTOR
E.B. BOUGHTON

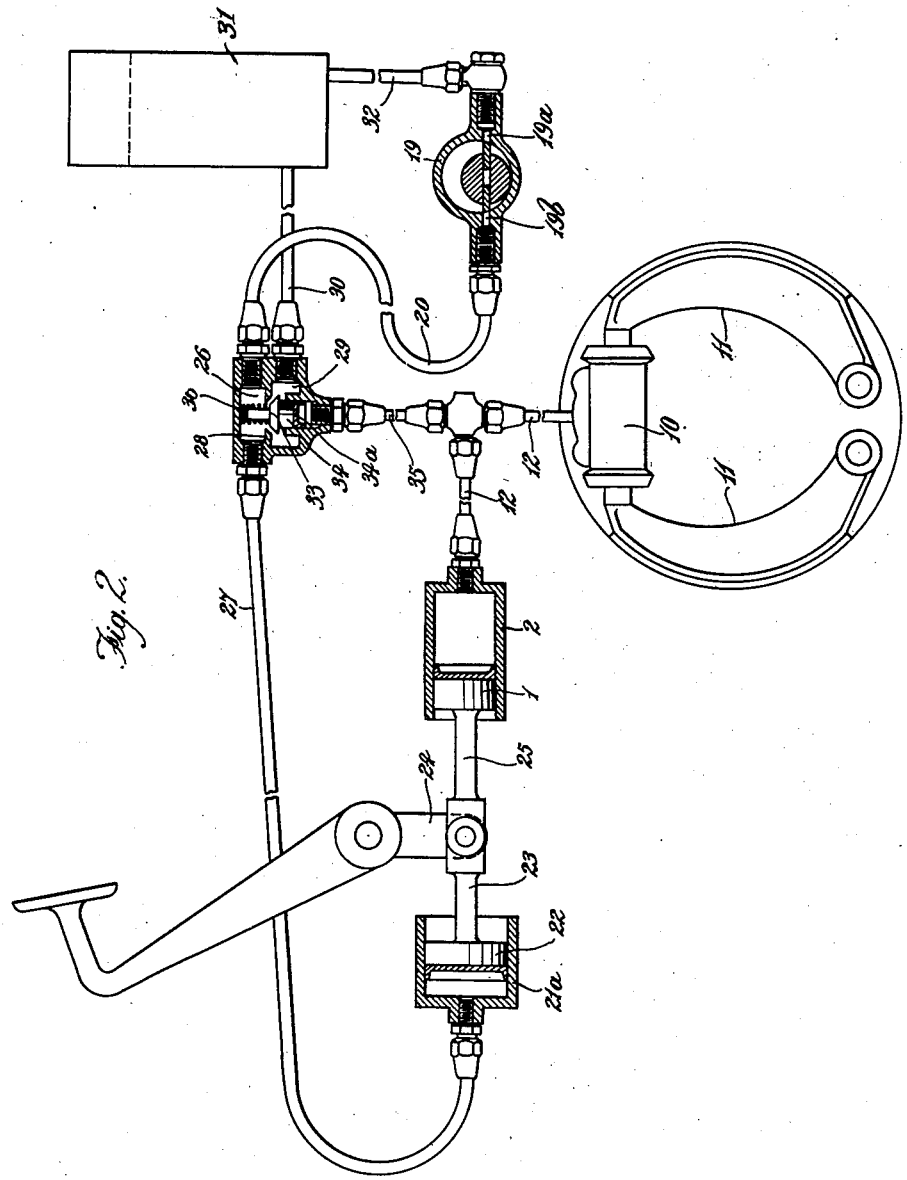

Patented Apr. 18, 1933

1,903,973

UNITED STATES PATENT OFFICE

EDWARD BISHOP BOUGHTON, OF LONDON, ENGLAND

BRAKE FOR USE ON VEHICLES

Application filed May 4, 1931, Serial No. 535,025, and in Great Britain May 17, 1930.

This invention relates to fluid pressure braking systems for vehicles of the kind comprising a master cylinder and piston device actuated by a foot pedal or other member and connected by a fluid pressure line or lines with a pressure producing piston and cylinder device or devices associated with the brakes and particularly relates to braking systems of this kind for tramway and railway vehicles.

With tramway and railway vehicles running on tracks there may, owing to varying conditions, be greatly differing co-efficients of friction between the wheels and the said tracks, and therefore there is the disadvantage, if the braking system is designed to take care of the maximum possible braking conditions with the highest co-efficients and loads, that under conditions of minimum co-efficients and loads the wheels are easily skidded and, in those cases where the vehicles have metal wheels and tires in contact with metal rails, the locking of the wheels causes flats and other disadvantages.

Fluid pressure braking systems have before been proposed in which the operating pressure on the master piston is produced by the action of a pump which is driven from the road wheels or associated rotating part of the vehicle, the fluid delivery from the pump being normally by-passed or freely circulated through a valve which is closed in order that pressure or fluid from the pump may actuate the master piston. In these known constructions the brakes are applied initially and mainly by the servo action of the pump and direct actuation of the master piston by the foot pedal or other operating member can only take place after the full servo braking has been attained, or, if the servo system fails or ceases to operate, after the pedal or like member has been moved sufficiently to close the valve referred to completely. In these prior constructions skidding of the wheels will result in the release of the servo applied braking pressure owing to the consequent stoppage of the pump, but it is still possible for the brakes to be applied by the direct operation of the foot pedal or member on the master piston to such an extent as to lock the wheels or to maintain the wheels locked.

The present invention has among its objects to provide an improved fluid pressure braking system of the kind referred to whereby the braking pressure which can be applied by the direct actuation of the master piston by the pedal or like operating member may be always maintained below the amount at which the wheels will skid under the worst conditions of friction co-efficient between the wheels and rails and the load.

According to the present invention a pressure limiting piston and cylinder device is connected to the fluid pressure line between the master piston and the brake operating piston or pistons, one end of the pressure limiting piston being accessible to the pressure in the line, while the other end of the piston is acted on by a spring which determines the maximum pressure which can be exerted in the line by the action of a brake pedal or other operating member on the master piston. It will be understood that the movement of the brake operating member is suitably restricted so that further pressure cannot be applied thereby after the pressure limiting spring has been compressed.

The pressure limiting device may be utilized in conjunction with a fluid pressure pump driven by or rotating with the road wheels or other associated rotating part of the vehicle. Thus, in one arrangement the delivery of the fluid pressure pump is connected to the pressure limiting cylinder in such manner that when the vehicle is in motion the action of the pump serves to supplement the resistance of the spring to the movement of the pressure limiting piston, thereby increasing the maximum pressure that can be applied by the actuation of the master piston by the pedal or other operating member, such increased pressure being automatically reduced, should the wheels lock or skid with consequent stoppage of the pump, to the amount which is below the predetermined limit.

In a modified arrangement the pressure limiting piston is provided with or adapted to actuate a valve member controlling the circulation of fluid by the pump, such valve member being normally open to permit free circulation of fluid to and from the pump but being adapted, when pressure in the line between the master piston and brake operating piston or pistons is increased up to the amount determined by the pressure limiting spring, to restrict the circulation of fluid which thereby builds up an additional pressure on the master piston through a suitably arranged conduit or passage communicating with a servo cylinder. The means employed for applying the additional pressure is preferably a rotary or like pump in which pressure is created while the pump is moving, but cannot be created or maintained when the pump is stationary. Alternatively, any other suitable construction of pump may be used and the return flow or release of the pressure when the pump is stationary may be provided for by a restricted by-pass or the like.

The invention is hereinafter described by way of example with reference to the accompanying diagrammatic drawings, in which:

Figure 1 is a part sectional elevation illustrating one arrangement according to the invention; and Figure 2 is a similar view illustrating a modification.

In carrying the invention into effect according to one construction, and with reference to Figure 1 of the accompanying diagrammatic drawings, a fluid pressure system is provided consisting of an operating piston 1 and cylinder 2, the piston 1 being actuated by the driver by any suitable means. For instance, as shown, the piston 1 may be engaged by an arm 3 mounted on a shaft 4 projecting from the side of the reservoir 5 in which the cylinder 2 is mounted, an arm 6 being fixed on the projecting end of the shaft 4 and at its outer end being connected by a link or links 7 to a movable member 8 adapted to be raised and lowered by a screw operating spindle 9. The cylinder 2 is connected by means of a pipe 12 to a piston and cylinder device 10 for operating the brake shoes 11.

At a suitable intermediate position in the pipe line 12 a connection 13 is provided for a pipe 14 leading to the cylinder 15 of a pressure limiting device having a piston 16, one end face of which is provided with a cup washer 16a and is accessible to the pressure in the pipe line 12 through the pipe 14. The other end of the piston is formed with an enlarged head or flange 16b which co-operates with the corresponding shoulder in the wall of the casing 17 of the device so as to form a stop for the piston 16. The piston 16 is normally held against the stop by means of a compression spring 18 which engages with the enlarged head 16b of the piston, which head preferably is circumferentially recessed for the reception of a packing ring 16c. The spring 18 may be selected or adjusted to a predetermined pressure at which the piston 16 will move away from its stop under the pressure in the pipe line 12, this predetermined pressure preferably being below the pressure at which the braking effort would cause the wheels to skid under the worst or predetermined conditions of the coefficient of friction and load.

This pressure limiting device therefore obviates skidding of the wheels by the application of the brakes by the driver.

The rotary pump 19 of the sliding vane type is arranged to be driven from the road wheels or axles or any other part of the vehicle which rotates or moves only when the wheels are rotating, the inlet and outlet ports 19a, 19b respectively being so arranged, and the pump itself being so conventionally constructed that when stationary it is not capable of maintaining pressure but will allow fluid to leak back from the outlet side to the inlet side of the pump. The delivery of the pump 19 is connected by the pipe 20 to the cylinder space 21 at the end of the piston 16 opposite to the cylinder space 15, while the inlet of the pump is connected to any suitable fluid reservoir.

In the operation of such a braking system the maximum amount of braking which can be applied when the vehicle is standing corresponds to the pressure which can be applied by the operator up to the limit which is determined by the spring 18 of the pressure limiting device, this pressure being sufficient under all ordinary braking conditions for holding the vehicle stationary. The movement of the operating member is limited so that it cannot produce further pressure in the system when the pressure limiting spring has been compressed. When braking is effected by the operator when the vehicle is running, a much higher braking pressure is available owing to the fact that the pressure which is generated by the pump 19 increases the resistance to the movement of the piston 16 away from its stop, and thus increases the maximum pressure which can be applied to the brakes. If the pressure applied is in excess of that which will ensure the maximum braking without skidding of the wheels, the wheels will skid and consequently the pump will stop. As soon as the pump stops rotating, the pressure exerted on the piston 16 through the pipe 20 will be released by the return flow of fluid through the pump, or alternatively through the small restricted leak or relief orifice between the pump and the piston 16. The release of this pressure immediately reduces the pressure in the pipes 12 down to the predetermined maximum pressure controlled by the spring 18 at which pressure the skidding of the wheels will cease, whereupon the braking is again automatically increased by the operation of the pump 19.

In a modification as illustrated in Figure 2 of the accompanying diagrammatic drawings, an additional device comprising a cylinder 21a and piston 22 is provided, such piston 22 acting directly through a rod 23 on the lever or foot pedal 24 which is connected by the rod 25 with the piston 1.

In this construction the delivery of the pump 19 is connected by the pipe 20 with a chamber 26 from which the pipe 27 leads to the cylinder 21a. The chamber 26 communicates through a valve controlled aperture 28 with a second chamber 29 which is connected by means of a pipe 30 with a fluid reservoir 31 which in turn is connected to the inlet of the pump 19 by a pipe 32. The aperture 28 is controlled by a valve 33 which is carried by a small piston 34 provided with a cup washer 34a and acted upon by the pressure in the pipe system 12 through the connecting pipe 35. The valve 33 is normally held off its seating by means of a spring 36, the strength of which determines the pressure in the system 12 at which the servo effect comes into action.

When the vehicle is running and the brake operating member or pedal 24 is off, the fluid from the pump flows through the pipe 20 into the chamber 26 through the aperture 28 into the chamber 29, and thence back into the reservoir 31, so that the pump does not have any influence on the application of the brakes. When the brake-operating member or pedal is moved to apply the brakes the pressure in the system 12 is increased up to the amount which is determined by the spring 36. As soon as this amount is exceeded the valve 33 is moved towards its seating under the action of the pressure in the system 12, and thereafter the fluid which is delivered by the pump 19 exerts a pressure in the cylinder 21a proportional to the amount of restriction of the free return flow of fluid to the reservoir, with the result that the piston 22 acts to reinforce the pressure on the piston 1 which has been already applied by the brake operating member or pedal 24. If the wheels lock and the pump stops, pressure in the cylinder 21a is at once released owing to the return flow of fluid or leakage through the pump so that the pressure in the system 12 returns to the amount due to the operation of the brake member or pedal 24 and limited by the strength of the spring 36. In this case, the system as a whole is so designed as regards the leverages and piston areas that it is not possible by manual effort alone to create in the system a pressure in excess of that chosen as being the maximum permissible under the most slippery conditions likely to be encountered.

What I claim is:—

1. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, and pressure generating means controlled by and proportional to the movement of the vehicle to provide for a pressure in the system in excess of the manually permissible pressure.

2. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, and pressure generating means controlled by and proportional to the movement of the vehicle to provide for a pressure in the system in excess of the manually permissible pressure, the vehicle augmented pressure being relieved on cessation of vehicle wheel turning incident to braking to restore the braking pressure in the system to the manually permissible pressure.

3. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, a pressure producing pump driven by the vehicle in normal movement, the pressure from the pump bypassing without effect on the braking system pressure while the pressure limiting piston is maintained unaffected by the braking line pressure, and means for utilizing the pressure from the pump to augment the brake line pressure when the pressure limiting piston is moved in response to the manually operable brake line pressure.

4. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, a pump operated in the normal movement of the vehicle for generating pressure, a bypass for the pump pressure. a valve operated by the pressure limiting piston to cut off the bypass in the resistance of the piston to the permissible manually operable pressure in the brake line system, and means for utilizing the pump pressure following the operation of the valve to cut off the bypass to augment the manually operable pressure in the brake line system.

5. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, means responsive to vehicle movement for creating pressure, means controlled by the pressure limiting piston for maintaining the vehicle generated pressure ineffective with respect to the brake line pressure when the pressure limiting piston is in one position, and utilizing the vehicle generated pressure to augment the brake line pressure when the pressure limiting piston is in another position.

6. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, means operated by the vehicle in normal movement for creating pressure, and means for utilizing the pressure so created to additionally resist movement of the pressure limiting piston in response to the manually created pressure in the brake line system.

7. A fluid pressure braking system for vehicles of the type including a manually operable master piston, a brake operating piston and a fluid pressure line connecting the pistons, said system including a pressure limiting piston open to the manual pressure in the system and movable to limit that pressure, means cooperating with the pressure limiting piston to predetermine the manually operable pressure in the system under which the pressure limiting piston will operate, means operated by the vehicle in normal movement for creating pressure, and means for utilizing the pressure so created to additionally resist movement of the pressure limiting piston in response to the manually created pressure in the brake line system, said vehicle created pressure being immediately relieved in its effect on the pressure limiting piston on cessation of normal movement of the vehicle.

In testimony whereof I have hereunto signed my name.

EDWARD BISHOP BOUGHTON.